(12) United States Patent
Lee (10) Patent No.: US 9,874,718 B2
(45) Date of Patent: Jan. 23, 2018

(54) WIDE ANGLE LENS SYSTEM

(71) Applicant: HANWHA TECHWIN CO., LTD., Changwon-Si (KR)

(72) Inventor: Won Sin Lee, Changwon-si (KR)

(73) Assignee: Hanwha Techwin Co., Ltd., Changwon-Si (KR)

(*) Notice: Subject to any disclaimer, the term of this patent is extended or adjusted under 35 U.S.C. 154(b) by 1 day.

(21) Appl. No.: 14/469,796

(22) Filed: Aug. 27, 2014

(65) Prior Publication Data
US 2015/0205070 A1 Jul. 23, 2015

(30) Foreign Application Priority Data
Jan. 21, 2014 (KR) .................. 10-2014-0007471

(51) Int. Cl.
*G02B 9/64* (2006.01)
*G02B 13/00* (2006.01)
*G02B 9/62* (2006.01)

(52) U.S. Cl.
CPC ............ *G02B 13/0045* (2013.01); *G02B 9/62* (2013.01)

(58) Field of Classification Search
CPC .......... G02B 13/18; G02B 13/04; G02B 9/62
USPC ....... 359/642, 708, 713, 676, 691, 749, 751, 359/752, 681
See application file for complete search history.

(56) References Cited

U.S. PATENT DOCUMENTS

| 4,412,726 | A | 11/1983 | Horimoto | |
|---|---|---|---|---|
| 6,934,094 | B2* | 8/2005 | Kojima | G02B 13/04 359/691 |
| 7,283,312 | B2 | 10/2007 | Kawada | |
| 8,144,405 | B2* | 3/2012 | Asami | G02B 13/004 348/340 |
| 8,248,715 | B2* | 8/2012 | Asami | G02B 13/04 359/752 |
| 8,289,628 | B2* | 10/2012 | Asami | G02B 13/06 359/714 |
| 8,416,511 | B2* | 4/2013 | Asami | G02B 13/004 359/771 |

(Continued)

FOREIGN PATENT DOCUMENTS

| JP | 2007-164079 A | 6/2007 |
|---|---|---|
| JP | 2008-134494 A | 6/2008 |
| JP | 2009-145839 A | 7/2009 |

OTHER PUBLICATIONS

Japanese Patent Application Publication No. 2006-113404, published Apr. 27, 2006, which corresponds to U.S. Patent Application Publication No. 2006/0083504(No. 6).

(Continued)

*Primary Examiner* — Stephone B Allen
*Assistant Examiner* — Travis Fissel
(74) *Attorney, Agent, or Firm* — Sughrue Mion, PLLC

(57) ABSTRACT

Provided is a wide angle lens system including: a first lens group having a negative refractive power; and a second lens group having a positive refractive power, wherein the first lens group and the second lens group are provided in that order from an object to an image, and the lens system satisfies a first conditional expression:

$$16 < |L/f| < 17.5$$

where L denotes a distance from a lens surface of the first lens group provided closest to the object to a lens surface of the second lens group provided closest to the image, and f denotes a focal length of the wide angle lens system.

12 Claims, 12 Drawing Sheets

(56) References Cited

U.S. PATENT DOCUMENTS

| | | | |
|---|---|---|---|
| 9,030,764 B2 * | 5/2015 | Asami | G02B 13/06 359/713 |
| 9,470,873 B2 * | 10/2016 | Asami | G02B 15/161 |
| 2006/0083504 A1 | 4/2006 | Matsusaka | |
| 2007/0201140 A1 | 8/2007 | Kato | |
| 2008/0307215 A1 | 12/2008 | Willems | |
| 2009/0296234 A1 * | 12/2009 | Asami | G02B 13/04 359/713 |
| 2010/0303436 A1 | 12/2010 | Chang et al. | |
| 2011/0102634 A1 | 5/2011 | Pardue | |
| 2011/0122512 A1 * | 5/2011 | Asami | G02B 13/0045 359/753 |
| 2012/0056978 A1 * | 3/2012 | Abe | G02B 13/06 348/36 |
| 2012/0089814 A1 | 4/2012 | Gupta et al. | |
| 2012/0105977 A1 * | 5/2012 | Katsuragi | G02B 15/177 359/691 |
| 2015/0058533 A1 | 2/2015 | El-Batal et al. | |

OTHER PUBLICATIONS

Japanese Patent Application Publication No. 2006-349920, published Dec. 28, 2006, with its English Abstract.
Japanese Patent Application Publication No. 2007-225959, published Sep. 6, 2007, which corresponds to U.S. Patent Application Publication No. 2007/0201140(No. 9).
Japanese Patent Application Publication No. 2007-226145, published Sep. 6, 2007, with its English Abstract.

* cited by examiner

WIDE ANGLE LENS SYSTEM

CROSS-REFERENCE TO RELATED APPLICATION

This application claims priority from Korean Patent Application No. 10-2014-0007471, filed on Jan. 21, 2014, in the Korean Intellectual Property Office, the disclosure of which is incorporated herein by reference in its entirety.

BACKGROUND

1. Field

Apparatuses consistent with exemplary embodiments relate to a wide angle lens system, and more particularly, to a two-group lens wide angle lens system.

2. Description of the Related Art

As solid image sensing devices such as a charge coupled device (CCD) or a complementary metal-oxide semiconductor (CMOS) have increasingly been produced in smaller sizes and produced to have more pixels, lens systems provided in image forming optical devices having the image sensing devices, such as digital cameras, video cameras, or surveillance cameras, have also been required to provide higher optical performance.

Also, with the increasing importance of security, many surveillance cameras for closed circuit television (CCTV) systems or precision measurement cameras are being used by individuals as well as public organizations and corporations.

Such users who using the surveillance cameras covet high resolution images which are distortion free, not only at the center region, but also at the side regions. Accordingly, a lens system included in the surveillance cameras need to not only provide wide viewing angle and but also generate an image with low distortion.

SUMMARY

One or more embodiments provide a two-group wide angle lens system.

Additional aspects will be set forth in part in the description which follows and, in part, will be apparent from the description, or may be learned by practice of the exemplary embodiments.

According to an aspect of an exemplary embodiment, there is provided a wide angle lens system including: a first lens group having a negative refractive power; and a second lens group having a positive refractive power, wherein the first and second group lenses are provided in that order from an object to an image, and the wide angle lens system satisfies a first conditional expression:

$$16<|L/f|<17.5$$

wherein L denotes a distance from a lens surface of the first lens group provided closest to the object to a lens surface of the second lens group provided closest to the image, and f denotes a focal length of the wide angle lens system.

The first lens group may include: a first lens having a negative refractive power; a second lens having a negative refractive power; a third lens having a negative refractive power; and a fourth lens having a positive refractive power, and the first through fourth lenses are provided in that order from the object to the image.

The second lens provided to the first lens group may include at least one aspherical surface.

The second lens group may include: a fifth lens having a positive refractive power; a sixth lens having a negative refractive power; and a seventh lens having a positive refractive power, and the fifth through seventh lenses are provided in that order from the object to the image.

The second lens group may include at least one cemented lens.

The fifth lens and the sixth lens may be cemented lenses.

The seventh lens may include at least one aspherical surface.

The seventh lens may include two aspherical surfaces.

The refractive index ($Nd_7$) of the seventh lens may satisfy a second conditional expression:

$$Nd_7<1.78.$$

The wide angle lens system may satisfy a third conditional expression:

$$4.0<f_L/f<4.4$$

where the f denotes the focal length of the wide angle lens system and $f_L$ denotes the focal length of the second lens group.

The wide angle lens system may satisfy a fourth conditional expression:

$$vd_4<25$$

where $vd_4$ denotes an Abbe number of the fourth lens.

The wide angle lens system may further include an aperture provided between the first lens group and the second lens group.

According to an aspect of an exemplary embodiment, there is provided a photographing apparatus including the wide angle lens system described above.

According to the exemplary embodiments, a wide angle lens system which has a small size with a high resolution and a wide angle of field is provided.

BRIEF DESCRIPTION OF THE DRAWINGS

The above and/or other aspects will become apparent and more readily appreciated from the following description of the embodiments, taken in conjunction with the accompanying drawings in which.

DETAILED DESCRIPTION

As the inventive concept allows for various changes and numerous exemplary embodiments, particular exemplary embodiments will be illustrated in the drawings and described in detail in the written description. The effects and features of the present inventive concept, and a method for achieving those will be clearly understood by referring to exemplary embodiments described in detail together with drawings. The inventive concept may, however, be embodied in many different forms and should not be construed as limited to the exemplary embodiments set forth herein.

Hereinafter, the exemplary embodiments will be described in more detail with reference to the accompanying drawings. Those components that are the same or are in correspondence are rendered the same reference numeral regardless of the figure number, and redundant explanations are omitted.

While such terms as "first," "second," etc., may be used to describe various components, such components must not be limited to the above terms. The above terms are used only to distinguish one component from another.

An expression used in the singular encompasses the expression of the plural, unless it has a clearly different meaning in the context.

In the present specification, it is to be understood that the terms such as "including" or "having," etc., are intended to indicate the existence of the features, or components and are not intended to preclude the possibility that one or more other features, or components thereof may exist or may be added.

For convenience of explanation, the size of elements may be exaggerated or reduced. For example, the size and thickness of each element shown in drawings are shown arbitrarily for convenience of explanation and the present invention is not necessarily limited by the drawings.

Expressions such as "at least one of," when preceding a list of elements, modify the entire list of elements and do not modify the individual elements of the list.

FIGS. 1, 4, 7 and 10 show optical layouts of a wide angle lens system according to exemplary embodiments.

Referring to FIGS. 1, 4, 7 and 10, the wide angle lens system includes a first lens group G1 and a second lens group G2 in an order from an object O side to an image I side.

The first lens group G1 has a negative refractive power, and may include four (4) lenses including a first lens $L_{11}$ with a negative refractive power, a second lens $L_{12}$ with a negative refractive power, a third lens $L_{13}$ with a negative refractive power, and a fourth lens $L_{14}$ with a positive refractive power, in that order, from the object O side to the image I side.

The first lens $L_{11}$ and the second lens $L_{12}$ may be negative meniscus lenses which are convex toward the object O side. The third lens $L_{13}$ may be a negative lens which is concave toward the image I side. The fourth lens $L_{14}$ may be a positive lens which is convex toward the object O side.

The first lens group includes at least one aspherical surface lens and, according to an exemplary embodiment, the aspherical surface lens may be the second lens $L_{12}$.

The second lens $L_{12}$ may include at least one aspherical surface. By providing an aspherical surface as the at least one surface of the second lens $L_{12}$, aberrations occurring off-axis, that is, astigmatic field curves, curvature of field and so on, can be reduced.

The second lens group G2 may include three (3) lenses including a fifth lens $L_{21}$ with a positive refractive power, a sixth lens $L_{22}$ with a negative refractive power and a seventh lens $L_{23}$ with a positive refractive power, in that order, from the object O side to the image I side.

The fifth lens $L_{21}$ and the sixth lens $L_{22}$ may be cemented lenses. That is, by cementing the fifth lens $L_{21}$ and the sixth lens $L_{22}$, aberrations such as a chromatic aberration may be corrected and the influence of attachment errors and so on during manufacturing may be reduced, thereby providing a stable optical quality. Also, the structure may be simplified and may be suitable for miniaturization.

The seventh lens $L_{23}$ may be a biconvex lens and may include at least one aspherical surface. That is, the seventh lens $L_{23}$ may have one aspherical surface on the object O side or on the image I side or may have aspherical surfaces on both surfaces.

By providing an aspherical surface on the at least one surface of the seventh lens $L_{23}$, aberrations occurring off-axis, that is, astigmatic field curves, curvature of field and so on, can be reduced.

An aperture ST may be further provided between the first lens group G1 and the second lens group G2. Between the second lens group G2 and an image plane IP, an optical block G may be further provided, and the optical block G may be an optical filter, such as a low pass filter (LPF) or an IR-cut filter, a cover glass (CG) for protecting an image pickup surface of an image sensing device, and so on.

With the exemplary embodiment described above, a wide angle lens system having a small size with a wide angle of view and high optical performance may be provided.

The wide angle lens system according to exemplary embodiments may satisfy the following conditional expression:

$$16 < |L/f| < 17.5 \qquad \text{Conditional Expression (1)}$$

Here, L denotes a distance from a lens surface of the first lens group G1 provided closest to the object O to a lens surface of the second lens group G2 provided closest to the image I, that is, the distance between the surface S1 of the first lens $L_{11}$ provided closest the object O and the surface S14 of the seventh lens $L_{23}$ provided closest the image I, and f denotes a focal length of the wide angle lens system.

The Conditional Expression (1) defines a range of a ratio of the length of the wide angle lens system to the focal length of the wide angle lens system.

In the range greater than or equal to the upper limit of the Conditional Expression (1), the optical performance, that is, the resolution, is lowered in a range where the half angle of view is greater than or equal to 90°, and in the range equal to or less than the lower limit, it may be difficult to obtain a half angle of view equal to or greater than 90°.

A wide angle lens system according to exemplary embodiments may also satisfy the following conditional expression:

$$Nd_7 < 1.78 \qquad \text{Conditional Expression (2)}$$

Here, $Nd_7$ denotes refractive index of the seventh lens $L_{23}$ included in the second lens group G2.

The Conditional Expression (2) shows the range of the refractive index of the lens of the second lens group G2 provided closest to the image I, that is, the seventh lens $L_{23}$ having a positive refractive power. In the range greater than or equal to the upper limit of the Conditional Expression (2), it may be difficult to control the coma aberration of the wide angle lens system.

A wide angle lens system according to exemplary embodiments may also satisfy the following conditional expression:

$$4.0 < f_L/f < 4.4 \qquad \text{Conditional Expression (3)}$$

Here, f denotes the focal length of the wide angle lens system and $f_L$ denotes a focal length of the second lens group G2.

The Conditional Expression (3) defines a range of a ratio of the focal length of the second lens group G2 to the focal length of the wide angle lens system, and it means that the focal length of the wide angle lens system is determined by the focal length of the second lens group G2.

In the range greater than or equal to the upper limit of the Conditional Expression (3), high performance may be obtained as the length of the wide angle lens system is increased, but it may be difficult to obtain a wide angle of view.

In the range less than or equal to the lower limit of the Conditional Expression (3), a wide angle of view may be obtained, but it may be difficult to obtain high performance on the periphery provided far from the optical axis.

A wide angle lens system according to exemplary embodiments may also satisfy the following conditional expression:

$$vd_4 < 25 \qquad \text{Conditional Expression (4)}$$

Here, $vd_4$ denotes the Abbe number of the fourth lens $L_{14}$.

The Conditional Expression (4) shows a range of refractive index of the lens of the first lens group G1 provided closest to the image I, that is, the fourth lens $L_{14}$ having a positive refractive power, and in the range greater than or equal to the upper limit of the Conditional Expression (4), an appropriate compensation for colors is not achieved and thus a problem in which colors of predetermined wavelengths appear in a formed image may occur.

Hereinafter, referring to tables 1 through 8, design data of a wide angle lens system according to exemplary embodiments will be explained.

In the design data, R denotes a radius [mm] of curvature (a surface in which the value of R being ∞ indicates that the surface is flat) of each lens surface.

$D_a$ denotes the distance [mm] between a lens surface and an adjacent lens surface on an optical axis, and therefore indicates the thickness of a lens or the distance between adjacent lenses. Nd denotes the refractive index of each lens, and vd denotes the Abbe number of each lens on a D-line (i.e. Fraunhofer D spectral line). An aspherical surface included in the exemplary embodiments is defined by the following equation (1):

$$z = \frac{ch^2}{1 + \sqrt{1-(1+K)c^2h^2}} + Ah^4 + Bh^6 + Ch^8 + Dh^{10} \qquad \text{Equation (1)}$$

An aspherical surface shape included in the wide angle lens system according to the exemplary embodiments may be expressed as the Equation (1) when it is assumed that the optical axis direction is a z-axis, a direction perpendicular to the optical axis direction is an h-axis, and the traveling direction of a light ray is positive.

Here, z denotes a distance from a vertex of a lens in the optical axis direction, h denotes a distance in the direction perpendicular to the optical axis, K denotes a conic constant, A, B, C and D denote aspherical surface coefficients, and c denotes a reciprocal (1/R) of the radius of curvature at the vertex of the lens.

First Exemplary Embodiment

Figure 1:
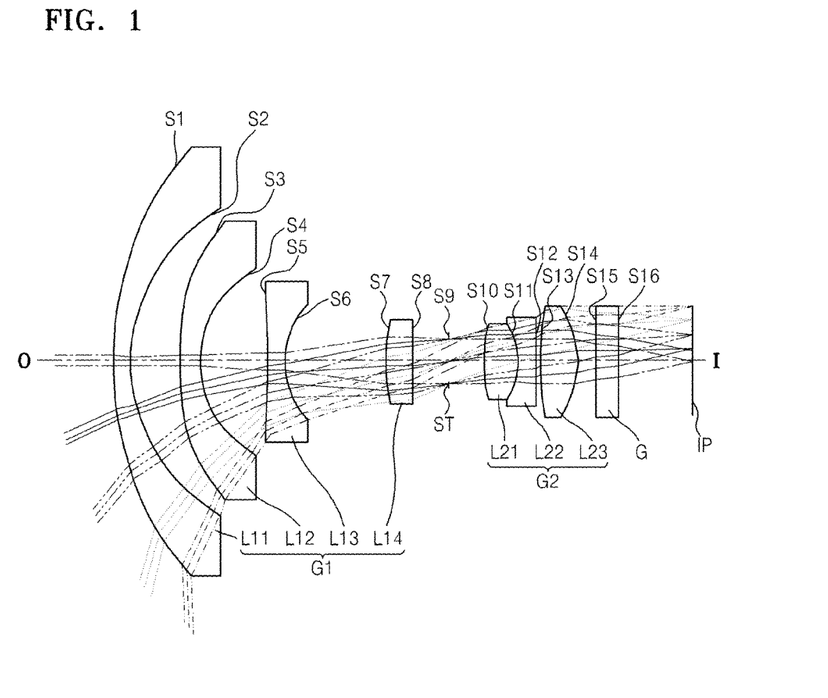
FIG. 1 shows an optical layout of a wide angle lens system according to an exemplary embodiment.

Table 1 shows design data of a wide angle lens system according to the first exemplary embodiment shown in FIG. 1. Referring to FIG. 1, Si denotes an i-th surface of a lens when a surface of the first lens $L_{11}$ provided closest to the object O is referred to as the first surface S1, and the surface number increases towards the image I.

TABLE 1

| Surface Number | R | $D_n$ | Nd | vd |
|---|---|---|---|---|
| S1 | 14.31757 | 0.800000 | 1.910822 | 35.2500 |
| S2 | 7.60000 | 2.120000 | | |
| S3* | 37.26864 | 0.862192 | 1.772501 | 49.4670 |
| S4* | 5.10883 | 2.825199 | | |
| S5 | −128.46759 | 0.800000 | 1.804200 | 46.5025 |
| S6 | 3.66708 | 4.313258 | | |
| S7 | 7.47526 | 1.200000 | 1.922860 | 20.8804 |
| S8 | −51.48540 | 1.549478 | | |
| Stop | ∞ | 1.491991 | | |
| S10 | 6.59083 | 1.437882 | 1.496997 | 81.6084 |
| S11 | −3.00000 | 0.800000 | 1.945945 | 17.9843 |
| S12 | −52.34188 | 0.200000 | | |
| S13* | 10.13674 | 1.600000 | 1.772501 | 49.4670 |
| S14* | −3.86514 | 0.808019 | | |
| S15 | ∞ | 1.000000 | 1.516798 | 64.1983 |
| S16 | ∞ | 3.191979 | | |
| IP | ∞ | 0.000000 | | |

In the Table 1, * indicates an aspherical surface. Table 2 shows the aspherical surface coefficients of aspherical surfaces included in the wide angle lens system according to the exemplary embodiment shown in FIG. 1. In the numbers of the aspherical surface coefficients, the notation 'E-m (m is an integer)' means×$10^{-m}$.

TABLE 2

| Surface Number | | | Aspherical surface coefficients | | |
|---|---|---|---|---|---|
| | K | A | B | C | D |
| S3 | 0 | 2.303832E−03 | −4.875579E−05 | 4.043873E−07 | 0 |
| S4 | 0 | 7.525880E−04 | 2.366994E−04 | −1.223166E−05 | 0 |
| S13 | 0 | −3.056644E−03 | 1.283469E−04 | 4.491479E−06 | −1.855641E−06 |
| S14 | 0 | 3.172632E−03 | −2.439345E−04 | 5.752041E−05 | −4.200861E−06 |

Figure 2:
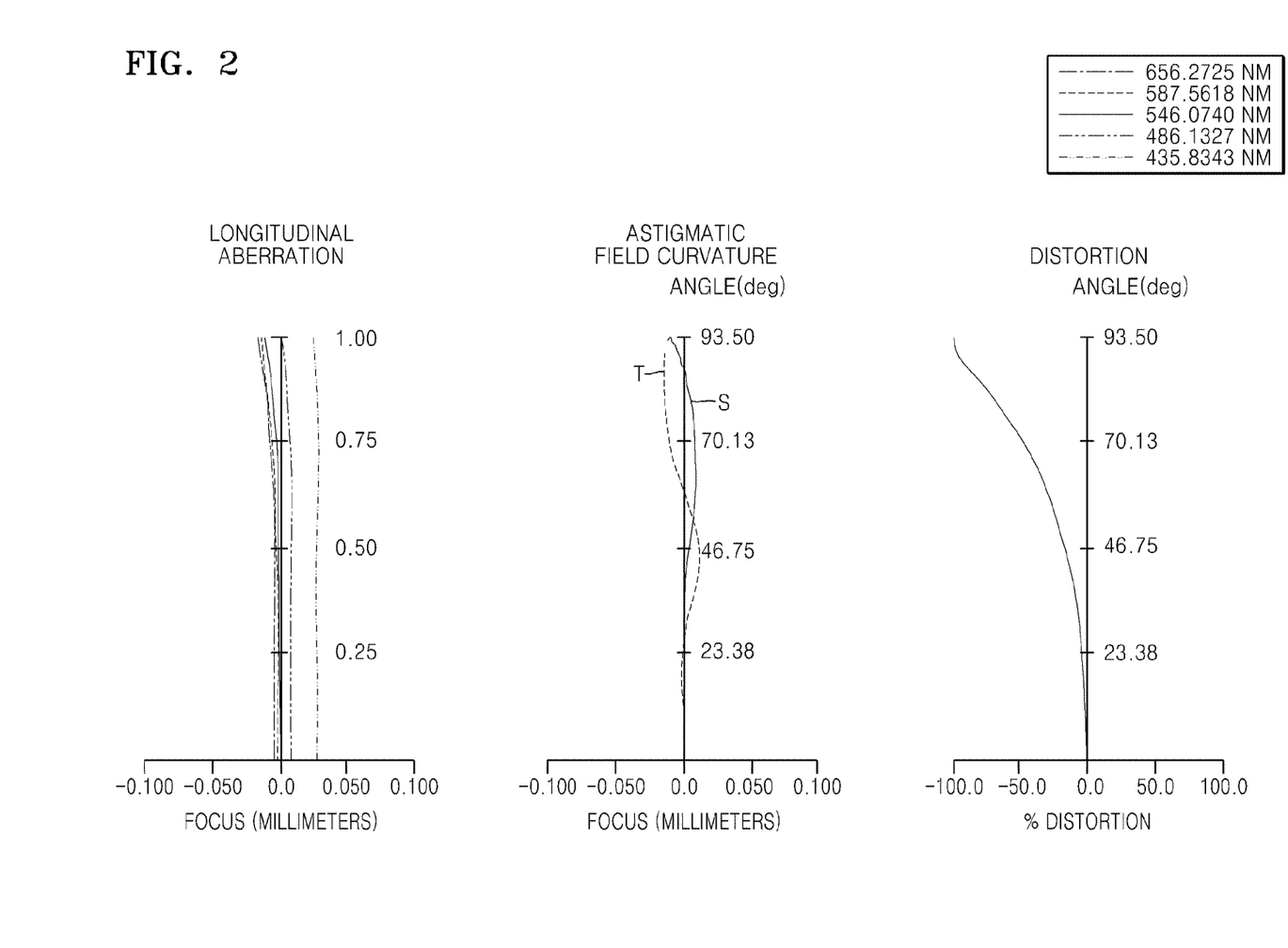
FIG. 2 is an aberration graph showing longitudinal aberrations of the wide angle lens system shown in FIG. 1 according to an exemplary embodiment.

FIG. 2 shows the longitudinal aberrations of the wide angle lens system shown in FIG. 1 and the graphs show the longitudinal spherical aberration, the astigmatic field curves, and the distortion, respectively. The longitudinal spherical aberrations are shown with respect to light rays having wavelengths of approximately 656.2725 nm, 587.5618 nm, 546.0740 nm, 486.1327 nm and 435.8384 nm. The astigmatic field curves and distortion are shown with respect to a light ray having a wavelength of 546.0740 nm. In the astigmatic field curves, the dotted line indicates the astigmatic field curves on the tangential surface T and the solid line indicates the astigmatic field curves on the sagittal surface S.

Figure 3:
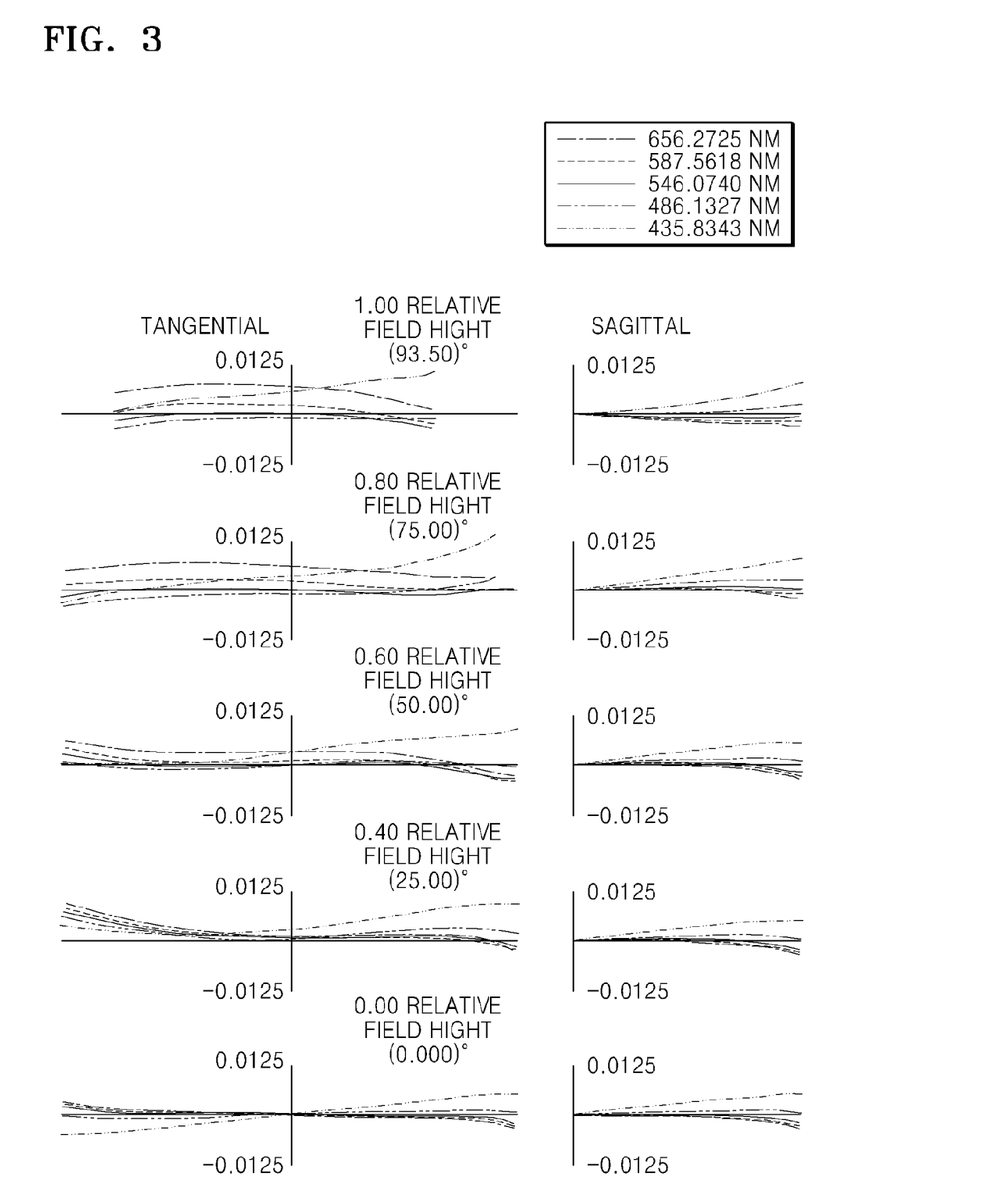
FIG. 3 is an aberration graph showing lateral aberrations of the wide angle lens system shown in FIG. 1 according to an exemplary embodiment.

FIG. 3 shows the lateral aberrations of the wide angle lens system shown in FIG. 1, and the graphs show the lateral aberrations on the tangential surface and sagittal surface, that is, the magnification chromatic aberration, the coma aberration and so on, with respect to light rays having wavelengths of approximately 656.2725 nm, 587.5618 nm, 546.0740 nm, 486.1327 nm and 435.8343 nm.

Second Exemplary Embodiment

Figure 4:
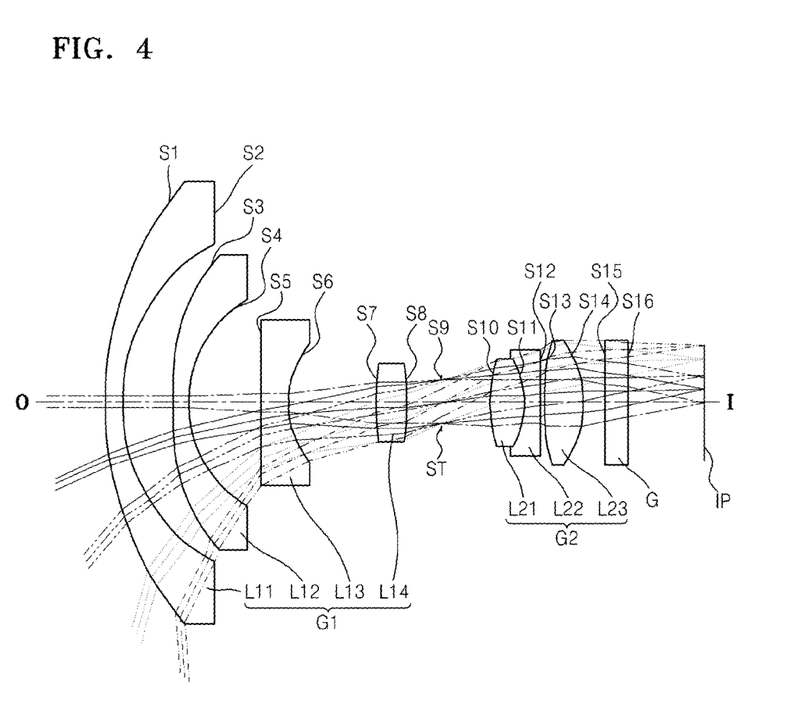
FIG. 4 shows an optical layout of a wide angle lens system according to an exemplary embodiment.

Table 3 shows design data of a wide angle lens system according to the second exemplary embodiment shown in FIG. 4.

TABLE 3

| Surface Number | R | $D_n$ | Nd | vd |
|---|---|---|---|---|
| S1 | 14.29342 | 0.700000 | 1.910822 | 35.2500 |
| S2 | 7.60000 | 2.100000 | | |
| S3* | 17.00000 | 0.700000 | 1.772501 | 49.4670 |
| S4 | 5.00000 | 3.040909 | | |
| S5 | −168.94715 | 1.100000 | 1.804200 | 46.5025 |
| S6 | 3.84484 | 3.717698 | | |
| S7 | 22.97195 | 1.200000 | 2.00272 | 19.3170 |
| S8 | −12.50050 | 1.471950 | | |
| Stop | ∞ | 2.056601 | | |
| S10 | 7.61000 | 1.402379 | 1.496997 | 81.6084 |
| S11 | −3.40000 | 0.700000 | 1.945945 | 17.9843 |
| S12 | −37.35559 | 0.200000 | | |
| S13* | 11.87454 | 1.610462 | 1.772501 | 49.4670 |
| S14* | −3.83144 | 0.837693 | | |
| S15 | ∞ | 1.000000 | 1.516798 | 64.1983 |
| S16 | ∞ | 3.162309 | | |
| IP | ∞ | 0.000000 | | |

In the Table 3, * indicates an aspherical surface. Table 4 shows the aspherical surface coefficients of aspherical surfaces included in the wide angle lens system according to the exemplary embodiment shown in FIG. 4. In the numbers of the aspherical surface coefficients, the notation 'E-m (m is an integer)' means×10-m

TABLE 4

| Surface Number | Aspherical surface coefficients | | | | |
|---|---|---|---|---|---|
| | K | A | B | C | D |
| S3 | 0 | 8.417532E−04 | −1.372213E−05 | 1.911865E−07 | 0 |
| S13 | 0 | −2.560645E−03 | −1.852394E−05 | 3.377011E−05 | −7.128291E−07 |
| S14 | 0 | 3.313307E−03 | −1.181650E−04 | 1.337748E−05 | 2.568224E−06 |

Figure 5:
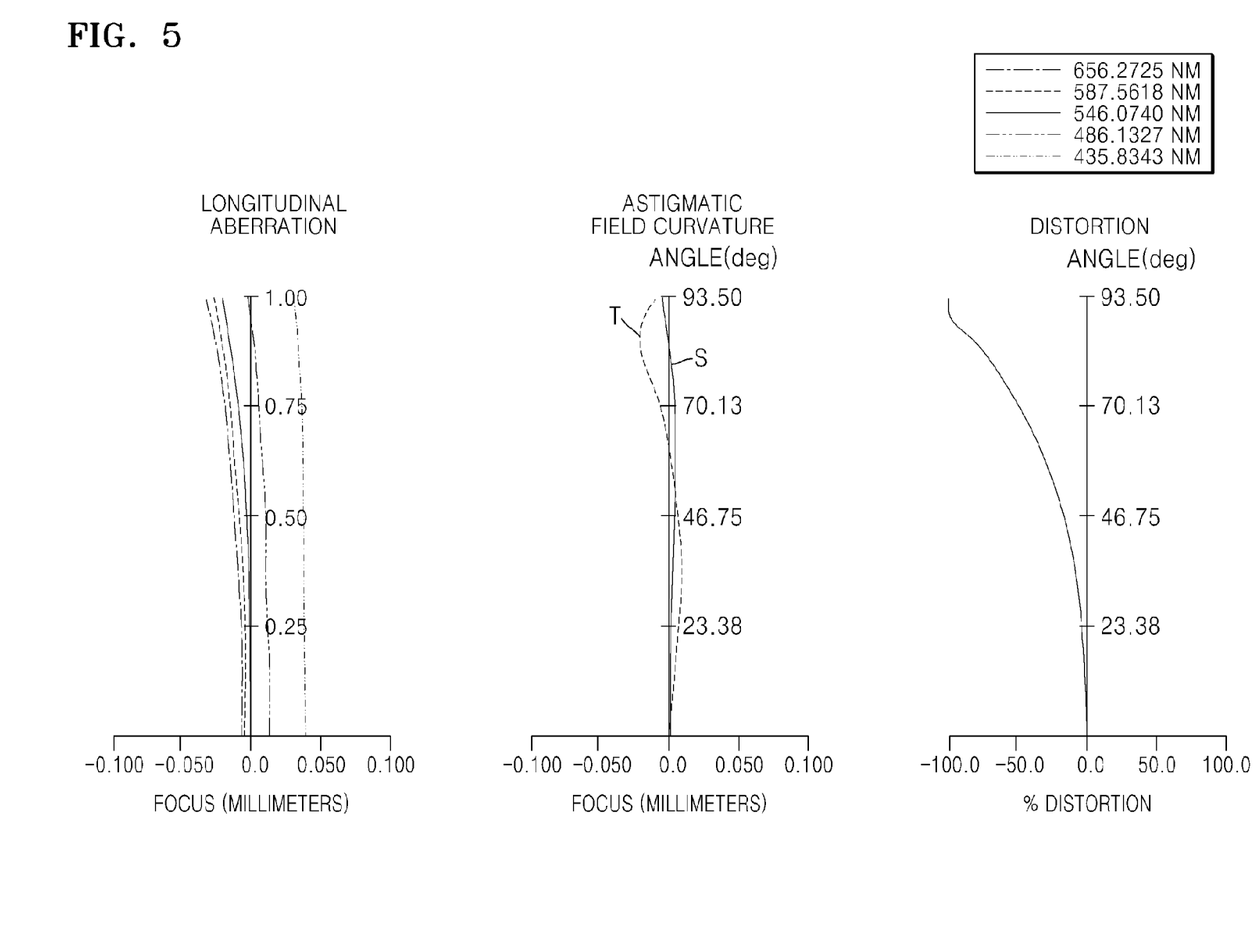
FIG. 5 is an aberration graph showing longitudinal aberrations of the wide angle lens system shown in FIG. 4 according to an exemplary embodiment.

FIG. 5 shows the longitudinal aberrations of the wide angle lens system shown in FIG. 4 and the graphs show the longitudinal spherical aberration, the astigmatic field curves, and the distortion, respectively. The longitudinal spherical aberrations are shown with respect to light rays having wavelengths of approximately 656.2725 nm, 587.5618 nm, 546.0740 nm, 486.1327 nm and 435.8384 nm. The astigmatic field curves and distortion are shown with respect to a light ray having a wavelength of 546.0740 nm. In the astigmatic field curves, the dotted line indicates the astigmatic field curves on the tangential surface T and the solid line indicates the astigmatic field curves on the sagittal surface S.

Figure 6:
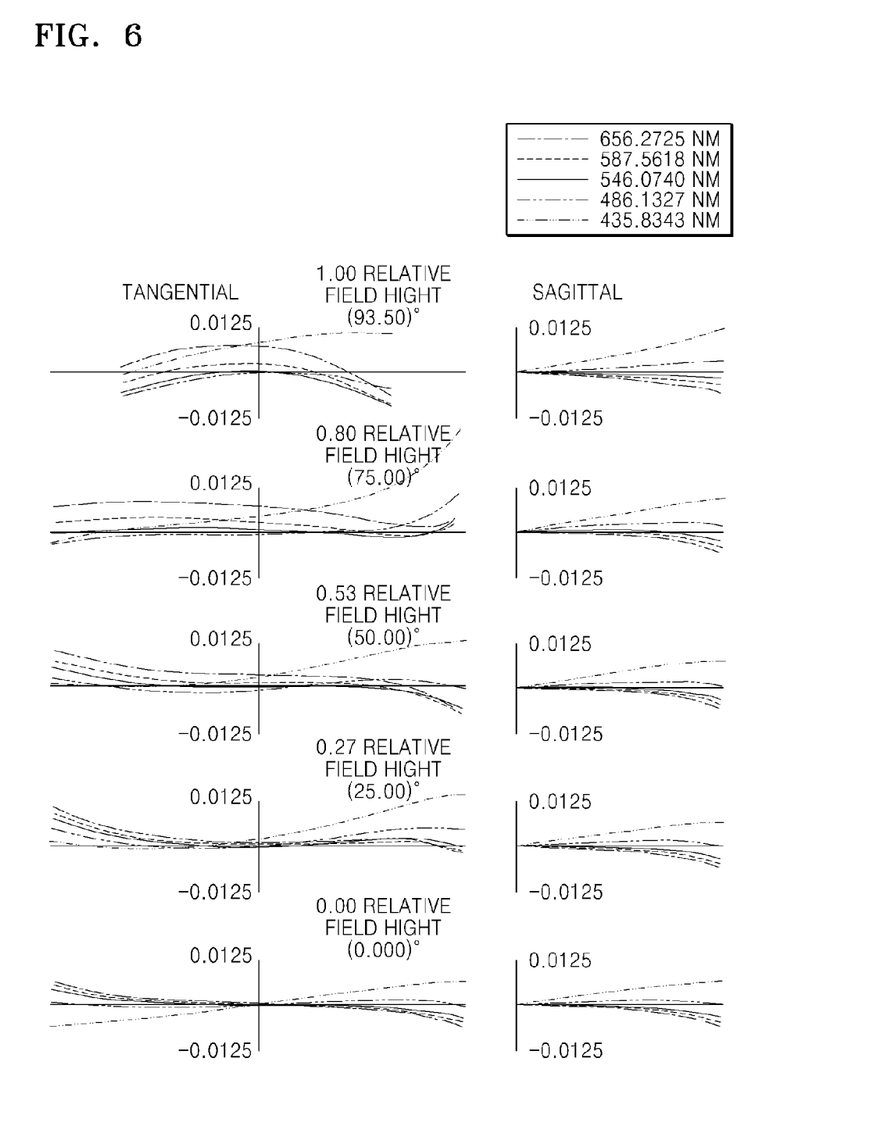
FIG. 6 is an aberration graph showing lateral aberrations of the wide angle lens system shown in FIG. 4 according to an exemplary embodiment.

FIG. 6 shows the lateral aberrations of the wide angle lens system shown in FIG. 4, and the graphs show the lateral aberrations on the tangential surface and sagittal surface, that is, the magnification chromatic aberration, the coma aberration and so on, with respect to light rays having wavelengths of approximately 656.2725 nm, 587.5618 nm, 546.0740 nm, 486.1327 nm and 435.8343 nm.

Third Exemplary Embodiment

Figure 7:
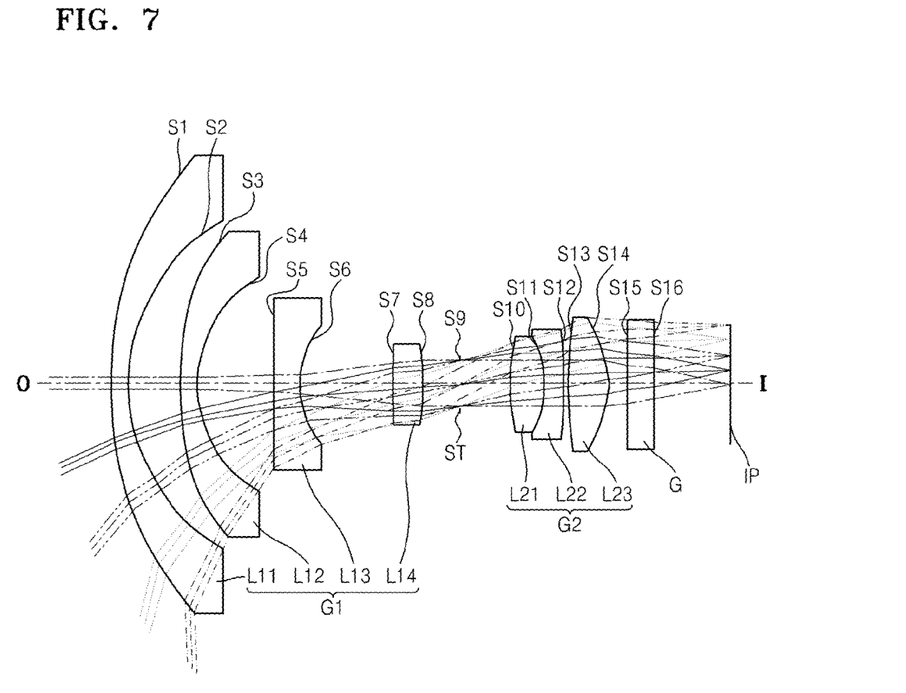
FIG. 7 shows an optical layout of a wide angle lens system according to an exemplary embodiment.

Table 5 shows design data of a wide angle lens system according to the third exemplary embodiment of shown in FIG. 7.

TABLE 5

| Surface Number | R | Dn | Nd | vd |
|---|---|---|---|---|
| S1 | 13.87809 | 0.700000 | 1.910822 | 35.2500 |
| S2 | 7.60000 | 2.120000 | | |
| S3* | 17.00000 | 0.700000 | 1.772501 | 49.4670 |
| S4 | 5.00000 | 2.857736 | | |
| S5 | 575.58595 | 1.020000 | 1.804200 | 46.5025 |
| S6 | 3.74491 | 4.461391 | | |
| S7 | 17.03191 | 1.200000 | 2.00272 | 19.3170 |
| S8 | −14.52490 | 1.241777 | | |
| Stop | ∞ | 1.771271 | | |
| S10 | 8.05000 | 1.354790 | 1.496997 | 81.6084 |
| S11 | −3.40000 | 0.700000 | 1.945945 | 17.9843 |
| S12 | 188.45294 | 0.200000 | | |
| S13* | 9.98058 | 1.672838 | 1.772501 | 49.4670 |
| S14* | −3.70880 | 0.837555 | | |
| S15 | ∞ | 1.000000 | 1.516798 | 64.1983 |
| S16 | ∞ | 3.162309 | | |
| IP | ∞ | 0.000000 | | |

In the Table 5, * indicates an aspherical surface. Table 6 shows the aspherical surface coefficients of aspherical surfaces included in the wide angle lens system according to the third exemplary embodiment shown in FIG. 7. In the numbers of the aspherical surface coefficients, the notation 'E-m (m is an integer)' means×10-m

TABLE 6

| Surface Number | Aspherical surface coefficients | | | | |
|---|---|---|---|---|---|
| | K | A | B | C | D |
| S3 | 0 | 8.474848E−04 | −1.337721E−05 | 1.863518E−07 | 0 |
| S13 | 0 | −2.943764E−03 | 1.263583E−04 | 1.431216E−05 | −7.825563E−07 |
| S14 | 0 | 3.534246E−03 | −1.142404E−04 | 2.802997E−05 | 4.564808E−07 |

Figure 8:
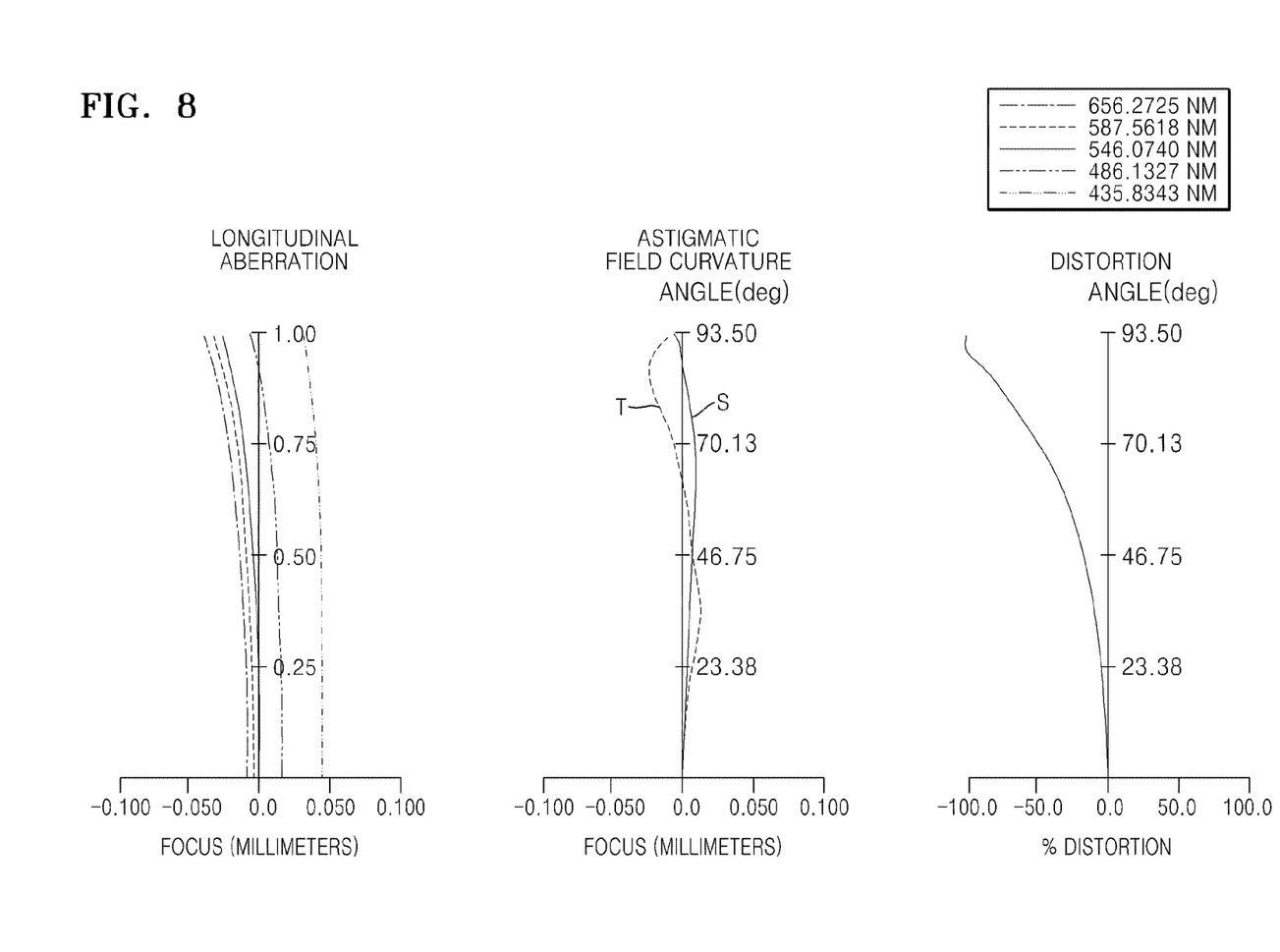
FIG. 8 is an aberration graph showing longitudinal aberrations of the wide angle lens system shown in FIG. 7 according to an exemplary embodiment.

FIG. 8 shows the longitudinal aberrations of the wide angle lens system shown in FIG. 7 and the graphs show the longitudinal spherical aberration, the astigmatic field curves, and the distortion, respectively. The longitudinal spherical aberrations are shown with respect to light rays having wavelengths of approximately 656.2725 nm, 587.5618 nm, 546.0740 nm, 486.1327 nm and 435.8384 nm. The astigmatic field curves and distortion are shown with respect to a light ray having a wavelength of 546.0740 nm. In the astigmatic field curves, the dotted line indicates the astigmatic field curves on the tangential surface T and the solid line indicates the astigmatic field curves on the sagittal surface S.

Figure 9:
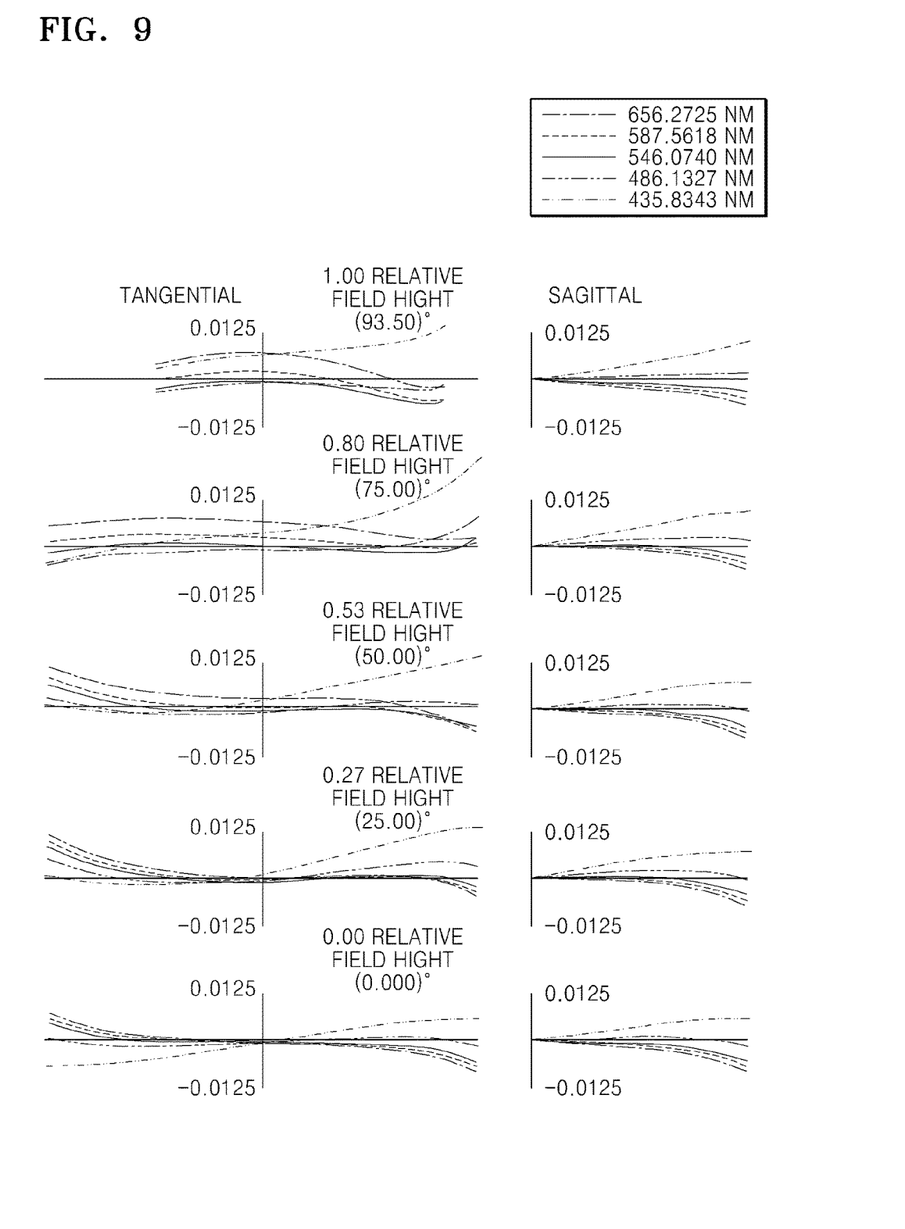
FIG. 9 is an aberration graph showing lateral aberrations of the wide angle lens system shown in FIG. 7 according to an exemplary embodiment.

FIG. 9 shows the lateral aberrations of the wide angle lens system shown in FIG. 7, and the graphs show the lateral aberrations on the tangential surface and sagittal surface, that is, the magnification chromatic aberration, the coma aberration and so on, with respect to light rays having wavelengths of approximately 656.2725 nm, 587.5618 nm, 546.0740 nm, 486.1327 nm and 435.8343 nm.

Fourth Exemplary Embodiment

Figure 10:
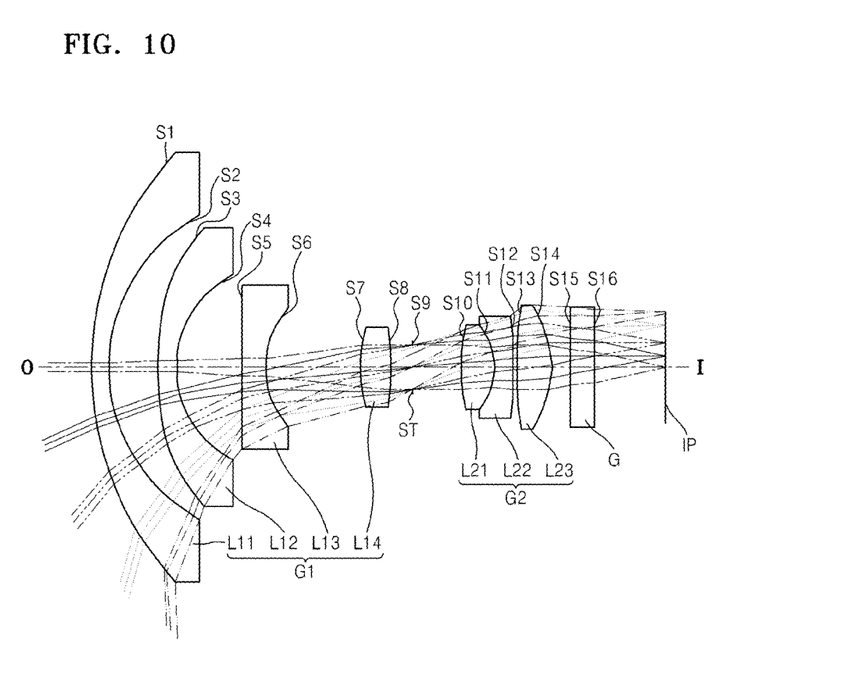
FIG. 10 shows an optical layout of a wide angle lens system according to an exemplary embodiment.

Table 7 shows design data of a wide angle lens system according to the fourth exemplary embodiment shown in FIG. 10.

TABLE 7

| Surface Numaber | R | $D_n$ | Nd | vd |
|---|---|---|---|---|
| S1 | 13.75683 | 0.800000 | 1.910822 | 35.2500 |
| S2 | 7.60000 | 2.120000 | | |
| S3* | 17.00000 | 0.800000 | 1.772501 | 49.4670 |
| S4 | 4.50000 | 2.844999 | | |
| S5 | −139.07290 | 1.020000 | 1.804200 | 46.5025 |
| S6 | 3.94469 | 4.176242 | | |
| S7 | 10.65985 | 1.200000 | 1.922860 | 20.8804 |
| S8 | −19.46903 | 0.972966 | | |
| Stop | ∞ | 2.150254 | | |
| S10 | 9.07459 | 1.415540 | 1.496997 | 81.6084 |
| S11 | −3.00000 | 0.800000 | 1.945945 | 17.9843 |
| S12 | −22.39026 | 1.500000 | | |
| S13* | 12.17064 | 1.672838 | 1.772501 | 49.4670 |
| S14* | −3.90006 | 0.827333 | | |
| S15 | ∞ | 1.000000 | 1.516798 | 64.1983 |
| S16 | ∞ | 3.172667 | | |
| IP | ∞ | 0.000000 | | |

In the Table 7, * indicates an aspherical surface. Table 8 shows the aspherical surface coefficients of aspherical surfaces included in the wide angle lens system according to the fourth embodiment shown in FIG. 10. In the numbers of the aspherical surface coefficients, the notation 'E-m (m is an integer)' means×10-m

TABLE 8

| Surface Number | Aspherical surface coefficients | | | | |
|---|---|---|---|---|---|
| | K | A | B | C | D |
| S3 | 0 | 9.693725E−04 | −1.660298E−05 | 2.223736E−07 | 0 |
| S13 | 0 | −1.635126E−03 | −7.562346E−05 | 1.846615E−05 | −5.329648E−07 |
| S14 | 0 | 3.685571E−03 | −1.665787E−04 | 1.671080E−05 | 5.686467E−07 |

Figure 11:
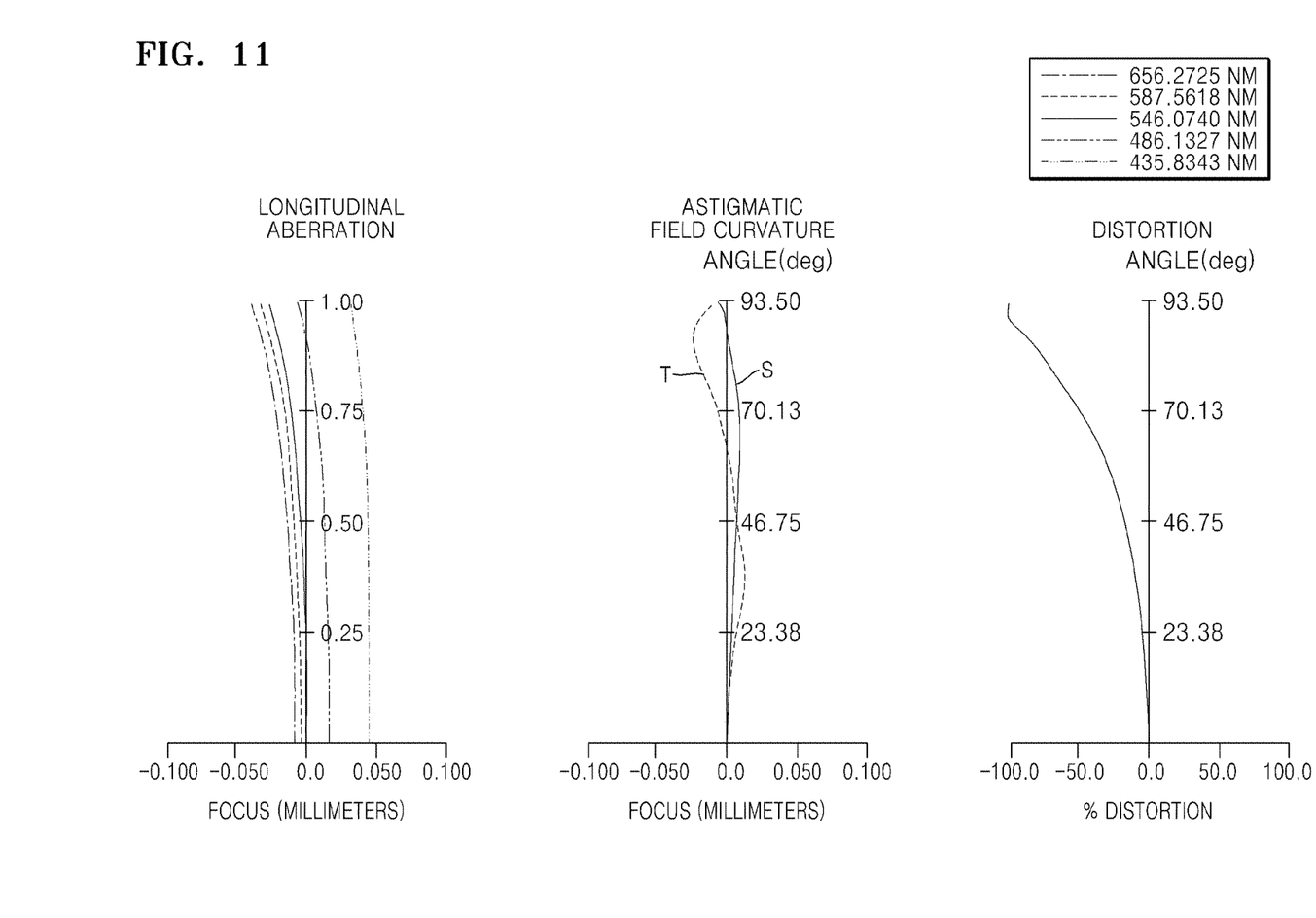
FIG. 11 is an aberration graph showing longitudinal aberrations of the wide angle lens system shown in FIG. 10 according to an exemplary embodiment.

FIG. 11 shows the longitudinal aberrations of the wide angle lens system shown in FIG. 10 and the graphs show the longitudinal spherical aberration, the astigmatic field curves, and the distortion, respectively. The longitudinal spherical aberrations are shown with respect to light rays having wavelengths of approximately 656.2725 nm, 587.5618 nm, 546.0740 nm, 486.1327 nm and 435.8384 nm. The astigmatic field curves and distortion are shown with respect to a light ray having a wavelength of 546.0740 nm. In the astigmatic field curves, the dotted line indicates the astigmatic field curves on the tangential surface T and the solid line indicates the astigmatic field curves on the sagittal surface S.

Figure 12:
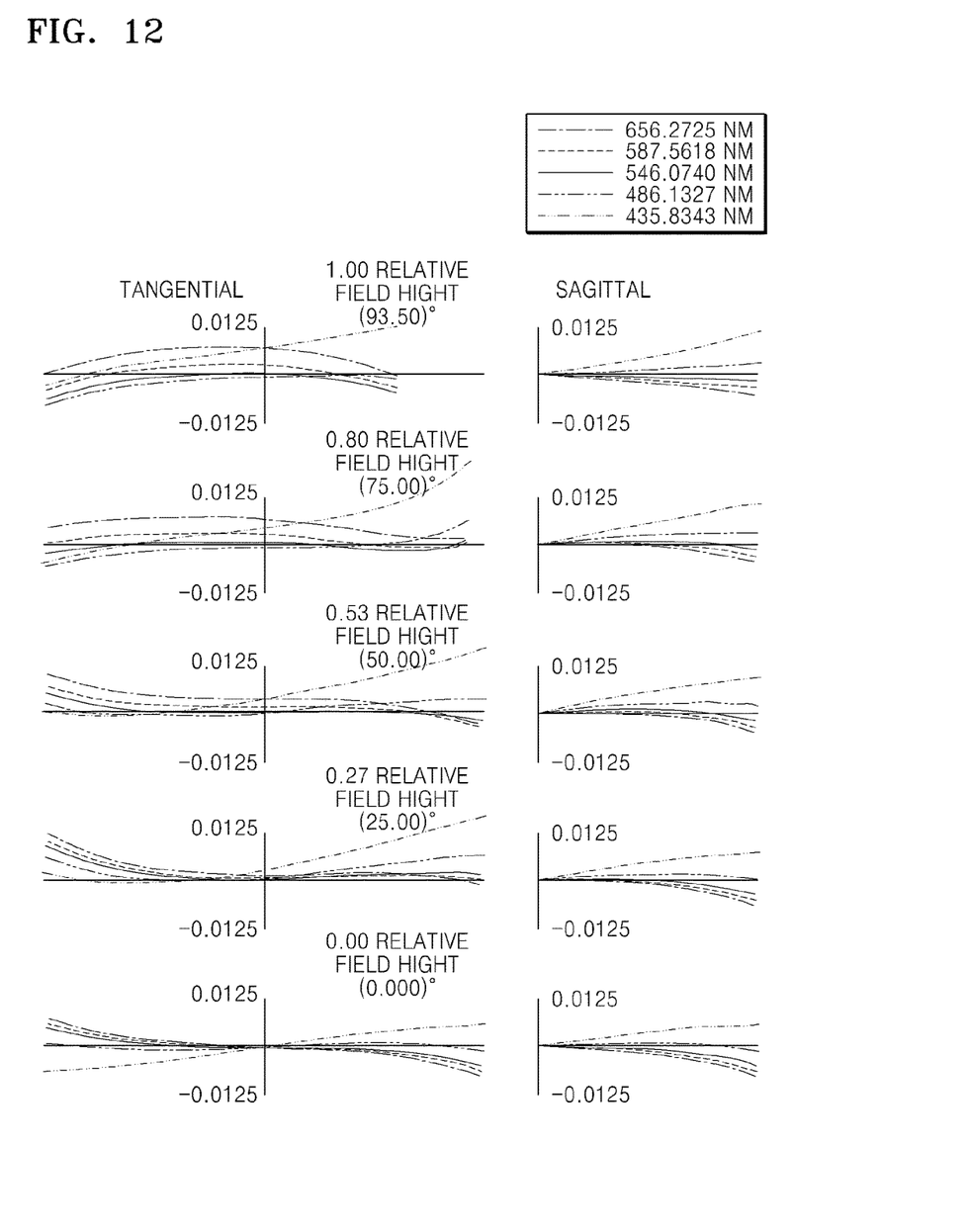
FIG. 12 is an aberration graph showing lateral aberrations of the wide angle lens system shown in FIG. 10 according to an exemplary embodiment.

FIG. 12 shows the lateral aberrations of the wide angle lens system shown in FIG. 10, and the graphs show the lateral aberrations on the tangential surface and sagittal surface, that is, the magnification chromatic aberration, the coma aberration and so on, with respect to light rays having wavelengths of approximately 656.2725 nm, 587.5618 nm, 546.0740 nm, 486.1327 nm and 435.8343 nm.

The following Table 9 shows the focal length f, f number Fno, and the half angle of view (ω) of the wide angle lens system according to each of the exemplary embodiments.

TABLE 9

| | First Embodiment | Second Embodiment | Third Embodiment | Fourth Embodiment |
|---|---|---|---|---|
| f [mm] | 1.1448 | 1.1448 | 1.1449 | 1.1448 |
| Fno | 2.5205 | 2.5544 | 2.5448 | 2.5508 |
| ω[°] | 93.5 | 93.5 | 93.5 | 93.5 |

The following table 10 shows that the wide angle lens systems according to the exemplary embodiments satisfy the Conditional Expressions (1) and (2).

TABLE 10

|  | First Embodiment | Second Embodiment | Third Embodiment | Fourth Embodiment |
|---|---|---|---|---|
| Conditional Expression 1 | 17.4703 | 17.4703 | 17.4686 | 17.4703 |
| Conditional Expression 2 | 4.3325 | 4.0382 | 4.1898 | 4.1473 |

The exemplary embodiments provide a wide angle lens system which has a small size with a high resolution and a wide angle of view.

Also, the wide angle lens system according to the exemplary embodiments may be used in photographing apparatuses having an image sensor (not shown) such as a surveillance camera, a digital camera or a video camera.

The image sensor may be a solid image sensing device, such as a charge coupled device (CCD) and a complementary metal-oxide semiconductor (CMOS), receiving light in which an image is formed by the wide angle lens system. The photographing surface of the image sensor corresponds to the image plane IP of the wide angle lens system.

It should be understood that the exemplary embodiments described therein should be considered in a descriptive sense only and not for purposes of limitation. Descriptions of features or aspects within each embodiment should typically be considered as available for other similar features or aspects in other embodiments.

While exemplary embodiments have been particularly shown and described above, it will be appreciated by those of ordinary skill in the art that various changes in form and details may be made therein without departing from the spirit and scope of the inventive concept as defined by the following claims.

What is claimed is:

1. A wide angle lens system comprising, in an order from an object to an image:
   a first lens group having a negative refractive power and comprising:
     a first lens having a negative refractive power;
     a second lens having a negative refractive power;
     a third lens having a negative refractive power; and
     a fourth lens having a positive refractive power; and
   a second lens group having a positive refractive power and comprising:
     a fifth lens having a positive refractive power;
     a sixth lens having a negative refractive power; and
     a seventh lens having a positive refractive power,
   wherein the lens system satisfies a first conditional expression for improving optical performance of a half angle of view equal to or greater than 90°:

$17 < |L/f| < 17.5$, wherein L denotes a distance from an object-side surface of the first lens to an image side surface of the seventh lens, and f denotes a focal length of the wide angle lens system, and
   wherein refractive index of the seventh lens satisfies a second conditional expression:

$1.65 < Nd_7 < 1.78$.

2. The wide angle lens system of claim 1, wherein the second lens of the first lens group comprises at least one aspherical surface.

3. The wide angle lens system of claim 1, wherein the second lens group comprises at least one cemented lens.

4. The wide angle lens system of claim 1, wherein the fifth lens and the sixth lens are cemented lenses.

5. The wide angle lens system of claim 1, wherein the seventh lens comprises at least one aspherical surface.

6. The wide angle lens system of claim 1, wherein the seventh lens comprises two aspherical surfaces.

7. The wide angle lens system of claim 1, satisfying a third conditional expression:

$4.0 < f_L/f < 4.4$ wherein the f denotes the focal length of the wide angle lens system and $f_L$ denotes a focal length of the second lens group.

8. The wide angle lens system of claim 1, satisfying a fourth conditional expression:

$vd_4 < 25$ wherein $vd_4$ denotes an Abbe number of the fourth lens.

9. The wide angle lens system of claim 1, further comprising an aperture provided between the first lens group and the second lens group.

10. A photographing apparatus comprising the wide angle lens system of claim 1.

11. The wide angle lens system of claim 1, wherein the second lens surface corresponds to a convex surface of a lens of the second lens group, the lens provided closest to the image.

12. The wide angle lens system of claim 1, wherein:
    the first lens group comprises a first positive lens having a positive refractive power, and
    the second lens group comprises a second lens having a positive refractive power, and
    wherein a first thickness of the first positive lens of the first lens group is less than a second thickness of the second lens of the second lens group, the first and the second thicknesses measured along an optical axis of the wide angle lens system.

* * * * *